(12) United States Patent
Gustin

(10) Patent No.: US 7,200,158 B2
(45) Date of Patent: Apr. 3, 2007

(54) CLOCK SYNCHRONIZING METHOD OVER FAULT-TOLERANT ETHERNET

(75) Inventor: Jay W. Gustin, Scottsdale, AZ (US)

(73) Assignee: Honeywell International, Morristown, NJ (US)

( * ) Notice: Subject to any disclaimer, the term of this patent is extended or adjusted under 35 U.S.C. 154(b) by 1056 days.

(21) Appl. No.: 10/318,677

(22) Filed: Dec. 13, 2002

(65) Prior Publication Data

US 2003/0235216 A1 Dec. 25, 2003

Related U.S. Application Data

(60) Provisional application No. 60/390,938, filed on Jun. 24, 2002.

(51) Int. Cl.
*H04J 3/06* (2006.01)

(52) U.S. Cl. ............... 370/509; 370/503; 709/248

(58) Field of Classification Search .......... None
See application file for complete search history.

(56) References Cited

U.S. PATENT DOCUMENTS

| | | | | |
|---|---|---|---|---|
| 5,355,124 A | 10/1994 | Kochem et al. | ....... | 340/825.05 |
| 5,386,542 A * | 1/1995 | Brann et al. | ......... | 709/248 |
| 5,495,232 A | 2/1996 | Kochem et al. | ....... | 340/825.05 |
| 5,953,345 A | 9/1999 | Findlater et al. | ........ | 370/446 |
| 6,108,726 A | 8/2000 | Runaldue et al. | ......... | 710/62 |
| 6,141,352 A | 10/2000 | Gandy | .............. | 370/463 |
| 6,154,464 A | 11/2000 | Feuerstraeter et al. | ...... | 370/463 |
| 6,157,955 A | 12/2000 | Narad et al. | .......... | 709/228 |
| 6,157,957 A * | 12/2000 | Berthaud | ............ | 709/248 |
| 6,222,852 B1 | 4/2001 | Gandy | .............. | 370/463 |
| 6,324,586 B1 * | 11/2001 | Johnson | ............ | 709/248 |
| 6,349,391 B1 * | 2/2002 | Petivan et al. | ........ | 714/11 |
| 6,385,208 B1 | 5/2002 | Findlater et al. | ........ | 370/419 |
| 6,401,117 B1 | 6/2002 | Narah et al. | ........ | 709/223 |
| 7,072,432 B2 * | 7/2006 | Belcea | ............ | 375/356 |
| 2001/0055311 A1 | 12/2001 | Trachewsky | ............ | 370/445 |
| 2002/0006136 A1 | 1/2002 | Mallory et al. | ............ | 370/466 |
| 2002/0012343 A1 | 1/2002 | Holloway | ............ | 370/389 |
| 2002/0026523 A1 | 2/2002 | Mallory et al. | ............ | 709/236 |
| 2002/0027886 A1 | 3/2002 | Fischer et al. | ............ | 370/225 |
| 2002/0041570 A1 | 4/2002 | Ptasinski et al. | ............ | 370/252 |
| 2002/0042836 A1 | 4/2002 | Mallory | ............ | 709/232 |
| 2002/0057713 A1 | 5/2002 | Bagchi et al. | ............ | 370/468 |
| 2002/0057717 A1 | 5/2002 | Mallory | ............ | 370/503 |

(Continued)

*Primary Examiner*—Duc Ho
(74) *Attorney, Agent, or Firm*—Ohlandt, Greeley, Ruggiero & Perle, LLP; Anthony Miologos

(57) ABSTRACT

A device that recognizes the time synchronization packet and substitutes a real-time value from the master internal counter into the proper place in a data packet is placed between an Ethernet Media Access Controller (MAC) and a Physical Interface Transceiver (PHY). A second device monitors the packet passing from the MAC to the PHY and determines when it is a time synchronization packet from the time master. Upon recognition of the proper packet, the second device simultaneously captures the master's time value and captures the value of a local real-time clock. The result of these captures are presented to the local host computer which controls the time base clock that increments the local real-time clock to either speed up or slow down this local clock, thereby synchronizing the local clock to the time master clock. The offset and skew of the local clock to the master clock is reduced to only the network latency plus variability due to network congestion.

23 Claims, 4 Drawing Sheets

U.S. PATENT DOCUMENTS

2002/0078247 A1  6/2002  Lu et al. .................... 709/251
2002/0078249 A1  6/2002  Lu et al. .................... 709/310
2002/0126684 A1  9/2002  Findlater et al. ............ 370/419

* cited by examiner

CLOCK SYNCHRONIZING METHOD OVER FAULT-TOLERANT ETHERNET

This Application claims the benefit of U.S. Provisional Application No. 60/390,938, filed Jun. 24, 2002.

FIELD OF THE INVENTION

The present invention generally relates to clock synchronization among a plurality of computing nodes connected in a network and, more particularly, to methods and devices for accomplishing the synchronization in a fault-tolerant Ethernet environment.

BACKGROUND OF THE INVENTION

It is necessary in many applications to synchronize the local clocks of the computing nodes of a network to avoid errors. This is particularly necessary in process control applications wherein the computing nodes are dealing with a sequence of events as clock errors may result in an event being interpreted as wrongly occurring before or after another event. Current methods are not accurate enough for power generation requirements of resolution of around 1 millisecond.

Each computing node in an Ethernet environment generally includes components that are capable of interfacing a computer at the node with computers at other nodes. These components include a physical (PHY) layer or transceiver and a media access controller (MAC). The PHY transceiver is connected to the network and the MAC is connected between the PHY transceiver and the local computer at the computing node. U.S. Pat. No. 5,953,345 describes a clock synchronization technique for an Ethernet environment. This technique employs a separate global clock signal and synchronization pulse, each being distributed on separate dedicated wires to the PHY transceiver and MAC controller of each node.

This technique is unsuitable for many applications, in which separate wires are unavailable or too expensive.

The present invention communicates synchronization information to Ethernet components that is accurate enough to achieve the required resolution without the dedicated wiring.

The present invention also provides many additional advantages that shall become apparent as described below.

SUMMARY OF THE INVENTION

A method according to the present invention synchronizes computing nodes in a control system. Each computing node comprises a host computer and a transceiver. The method monitors a master time data packet for a time stamp contained therein. The data packet is provided by the host computer to the transceiver for a master timer mode and is provided by the transceiver to the host computer for a listening mode. During the listening mode, the monitored time stamp is saved and the host computer is notified of the saved time stamp. During the master timer mode, a current time stamp value is substituted for the monitored time stamp. The time data packet with the substituted time stamp is supplied to the transceiver.

In one embodiment of the method, the time data packet is also monitored for a checksum value. During the master timer node, a calculated checksum value is substituted for the monitored checksum value and supplied to the transceiver. During the listening mode, the host computer is notified or not notified of the monitored time stamp based on a comparison of the monitored checksum value with the calculated checksum value.

In another embodiment of the method of the invention, a current time value is also saved when the monitored time stamp is detected. Preferably, the computing node further comprises a local timer, which the method adjusts during the listening mode based on the saved time stamp and the saved current time. The offset and skew of the local clock to the master clock is reduced to only the network latency plus variability due to network congestion.

In still another embodiment of the method, the time data packet is also monitored for an identity of the sender of the time data packet. The method is restarted if the identity is invalid.

In yet another embodiment of the method, the time data packet is also monitored for a multicast address. The method is restarted if the computing node is not a subscriber to the multicast address.

In a further embodiment of the method, the computing node also includes a network controller disposed between the host computer and the transceiver. Preferably, the network is a fault-tolerant Ethernet, the transceiver is a PHY transceiver and the network controller is a MAC controller.

A real-time synchronizing circuit of the present invention is disposed between the host computer and the transceiver of a computing node. The real-time synchronizing circuit comprises a local timer and a logic device. The logic device is operable in a master-time transmit mode and in a listen mode. During the master-time transmit mode, the logic device substitutes a current time value of the local timer for a master time stamp contained in a packet of data provided by the host computer. The packet of data with the substituted current time value is forwarded to the transceiver, thereby compensating for delay due to the host computer. During the listen mode, the logic device saves (or stores) a master time stamp contained in a packet of data received from the transceiver and also saves a current value of the local timer.

In one embodiment of the real-time clock synchronizing circuit of the invention, the master time stamp is not saved during the listen mode if the packet of data includes an invalid identity of a sender thereof.

In another embodiment of the real-time clock synchronizing circuit, the master time stamp is not saved during the listen mode if the packet of data includes a multicast address and the circuit is a non-subscriber to the multicast address.

In still another embodiment of the real-time clock synchronizing circuit of the invention, the computing node further comprises a network controller disposed between the host computer and the transceiver. Preferably, the computing node is connected in a fault-tolerant Ethernet network, the transceiver is a PHY transceiver and the network controller is a MAC controller.

A computing node of the present invention comprises a host computer and a transceiver adapted for connection in a network and a real-time synchronizing circuit. The real-time synchronizing circuit includes a local timer and a logic device that is operable in a master-time transmit mode and in a listen mode. During the master-time transmit mode, the logic device substitutes a current time value of the local timer for a real-time master time stamp contained in a packet of data provided by the host computer. The packet of data with the substituted current time value is forwarded to the transceiver, thereby compensating for delay due to the host computer. During the listen mode, the logic device saves a master time stamp contained in a packet of data received from the transceiver and also saves a current value of the local timer.

In one embodiment of the computing node of the invention, the host computer performs an update operation by adjusting the local timer based on the saved master time stamp and the saved current time value.

In another embodiment of the computing node of the invention, the master time stamp and the local current time value are saved in first and second registers, respectively.

In still another embodiment of the computing node of the invention, the real-time synchronizing circuit further comprises a shift register for receiving the packet of data from the host computer and a multiplexer for switching an input of the transceiver to receive the packet of data from the shift register, except for the master time stamp, and to receive the current time value of the local timer in lieu thereof.

In yet another embodiment of the computing node of the invention, a network controller is disposed between the host computer and the transceiver.

In a further embodiment of the computing node of the invention, the computing node is connected in a fault-tolerant Ethernet network, the transceiver is a PHY transceiver and the network controller is a MAC controller.

In any of the embodiments of the method, real-time clock synchronizing circuit and the computing node, the time stamp includes a real-time value.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENTS

Figure 1:
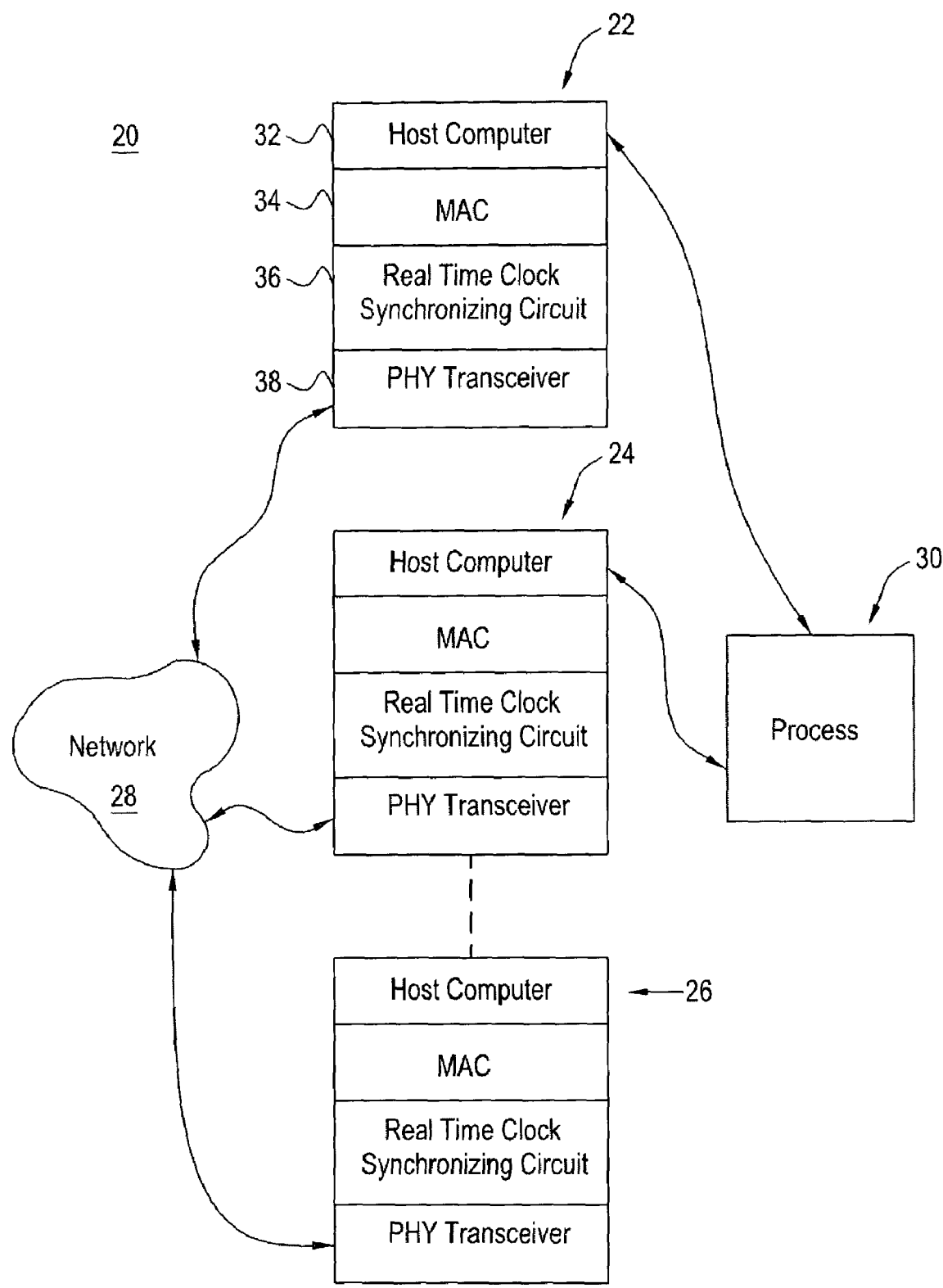
FIG. 1 is a block diagram of a control system that includes the synchronization device of the present invention.

Referring to FIG. 1, a control system 20 includes a plurality of computing nodes 22, 24 and 26 of the present invention that are disposed to control, monitor and/or manage a process 30. Although three computing nodes are shown, the dashed line between computing nodes 24 and 26 indicates that more or less computing nodes can be used. Computing nodes 22 and 24 are shown with connections to process 30. These connections can be to a BUS to which various sensors and/or control devices are connected. For example, the local BUS for one or more of the computing nodes 22 and 24 could be a Fieldbus Foundation (FF) local area network. Computing node 26 has no direct connection to process 30 and may be used for management of the computing nodes, observation and other purposes.

Computing nodes 22, 24 and 26 are interconnected via a network 28. Network 28 may be any suitable wired, wireless and/or optical network and may include the internet, an intranet, the public telephone network, a local and/or a wide area network. Preferably, network 28 facilitates an Ethernet environment.

As the computing nodes 22, 24 and 26 are substantially identical, only computing node 22 will be described in detail. Computing node 22 includes a local or host computer 32, a media access controller (MAC) controller 34, a real-time synchronizing circuit 36 and a physical interface (PHY) transceiver 38. Host computer 32, MAC controller 34 and PHY transceiver 38 may suitably be commercially available components.

Real-time synchronizing circuit 36 is a synchronizing device of the present invention and is disposed between the MAC controller 32 and the PHY transceiver 38. Real-time synchronizing circuit 36 is capable of enabling a computing node to act as a master time clock node or a listening node. A master time clock node transmits a data packet on a multicast basis to other computing nodes in control system 20. By multicast is meant the data packet contains an identification of a group of subscribing computing nodes. Any node that is a member of the subscriber group is enabled to receive or listen to the data packet.

In accordance with the invention, real-time synchronization circuit 36, when in a master time mode, recognizes a master time clock data packet assembled by its associated host computer 32 and inserts a real-time stamp from the master local timer into the proper place in the data packet. The insertion is made as close as possible to the interface to the PHY transceiver, thereby avoiding delays inherent in host computer 32 and MAC controller 34.

When in a listen mode, real-time synchronization circuit 36 recognizes the data packet identity and captures the real-time stamp of a received master time data packet as well as the local time value of a local timer. These saved values enable the host computer 32 to adjust the local timer to be in synchronization with the received master time stamp. That is, the local host computer 32 controls the local time base clock that increments or decrements the local real-time clock to either speed up or slow down the local real-time clock. Thus, the local clock can be synchronized to the time master clock. The offset and skew of the local clock to the master clock is reduced to only the network latency plus variability due to network congestion. The interrupt and processing latency of the two computer platforms (the time master and the local node) are eliminated.

Time Synchronization Packet

In one embodiment of the invention, the information necessary to synchronize listener nodes to a master node will be sent in a Foundation Field BUS (FF) High Speed Ethernet (HSE) test packet. This packet is multicast to all nodes that participate in the Fault-Tolerant Ethernet (FTE) community. Nodes that are not participating in the FTE community can synchronize time by subscribing to the multicast address that the FTE test message is transmitting. The HSE test packet contains a place for a time stamp. The HSE specification does not provide for this time stamp to be accurate. One can, however, use this time stamp to send an accurate time signature. Listener nodes can use this accurate time by being configured to recognize the source FF HSE device ID of the time master node and use its time stamp as an accurate time reference.

HSE Time Stamp

The HSE time stamp is a 64-bit word that contains a signed number that is a binary multiple of $1/32$ of a millisecond. The number represents an offset from Midnight, Jan. 1, 1984. The likely source of this standard is that $1/32$ of a millisecond is 32 KHz, a popular frequency crystal for watches, embedded computer real-time clocks and like.

FTE Use of Time Stamp in System 20

For example, the basic clock for the host computer 32 may be 33 MHz. Since it is difficult to get to 1/32 of a millisecond, the present inventors have discovered that the best compromise is to divide the 33 MHz clock by 33⅓ and get to 1 microsecond for the basic time tick. This clock can be divided by 125 to get to 125 microseconds, which is ⅛ of a millisecond. For purposes of sequence of event (SOE) determinations, 125 microseconds is adequate to get to 1 millisecond time accuracy. Clock master nodes will use 125 microseconds and binary count from there. When sending the time stamp in the HSE test message, the two Least Significant Bits (LSBs) of the time stamp will be set to zero.

Error Sources

Static Errors

In an Ethernet system there are sources for static errors in the clock timing. The first is the basic difference in crystals frequencies in a system that has no node-to-node synchronism. Off the shelf oscillators are typically 100 parts per million (PPM) in frequency accuracy. For extra cost 50 PPM can be achieved.

For purposes of SOE determinations, the frequency accuracy is only important in the listener node since the master is the reference. If the user wants the time to be accurate to a wall clock, then the master clock registers must be synchronized with an accurate universal source of time. In the past, this was accomplished with a frequency of 50 or 60 Hz derived from the power grid. Lately, the use of Global Positioning Satellite (GPS) receivers has become popular for this function. GPS has the advantage of accurate date and time as well as frequency accuracy.

Another source of fixed error is the time between the beginning of a packet and the place where the time stamp is located in the packet. Similarly, there is an error introduced in the receiver between when the message begins and when the time stamp appears in the message.

A relatively small error is introduced by the relativistic delay in the wires or fibers used to transmit the data.

Dynamic Errors

The largest sources of error are the dynamic errors in the system. One source is the amount of latency there is in the system once the packet has left the transmitter. This depends on details in the Ethernet network. Included in the dependencies are the number of switches in the path between the time master and the listener, the amount of times the packet is copied in each switch and the congestion of the queues in each switch.

Another source of dynamic error is the latency in the listener between when the packet is received and when the clock register is changed. There can be several sources of this error including interrupt response, priority of the interrupt service routine, load on the BUS where the Ethernet packets are transferred and speed of the processor servicing the data and number of times the operating system copies the packet before the user coded driver gets to the data.

In the transmitter, there is a dynamic error between the time the data is fetched from the clock register and the time the data is written to the packet buffer. This time differential can be affected by speed of the processor, loading on the BUS where the time registers reside as well as loading on the BUS where the Ethernet transmitter gets the packet data, and operating system overhead to queue the packet for transmission.

There is also a dynamic change in the frequency error of the receiver and transmitter oscillator. This drift over time and temperature is included in the 100 PPM or 50 PPM specification for the device.

Minimizing Dynamic Latency

Transmitter Latency

The primary contributors to transmitter latency errors are in the operating system and BUS loading. Both of these effects cannot be controlled without major impacts to the system hardware design. The best approach is to get the value of the time as close to the transmission media as possible. There is a convenient place in the Ethernet transmission path to do this function. The data is formatted in a standard interface known as Media Independent Interface (MII). This is a known interface that can be intercepted by a set of logic and used for removing much of the latency in the transmitter. The MII interface from the transmitting MAC controller 34 to the PHY transceiver 38 can be broken and fed into real-time synchronization circuit 36 for manipulation. Real-time synchronization circuit 36 can monitor all of the packet data going out to PHY transceiver 38 and when it recognizes the HSE test packet it can go to work. The packet will be passed without modification to PHY transceiver 38 until it gets to the time stamp part of the packet. Real-time synchronization circuit 36 can then insert the value that is contained in the time registers that are kept in real-time synchronization circuit 36. This process will remove all of the operating system/processor/BUS related latencies in the transmitter. Real-time synchronization circuit 36 also calculates a new Frame Check Sequence (FCS) as the data in the packet has changed. The recalculated FCS is inserted in the packet at the proper place and sent to PHY transceiver 38.

Listener Latency

A similar technique can be used in real-time synchronization circuit 36, when in the listen mode, to remove the latency caused by operating system/processor/bus. The MII BUS between PHY transceiver 38 and MAC controller 34 is intercepted by the real-time synchronization circuit 36. Real-time synchronization circuit 36 also contains the time registers in the receiving node. Real-time synchronization circuit 36 will need configuration by host computer 32 in the node. Real-time synchronization circuit 36 needs to know the IP multicast address of the HSE test packet on the device ID of the time master node. Data packets on the incoming MII interface are snooped by real-time synchronization circuit 36 and when the configured IP address is found, the logic then looks for the time master FF HSE device ID. When the master ID is found, the logic waits until the time stamp portion of the packet begins. The time stamp is then stored in a temporary register. At this time, the logic captures the local time stamp register in a register that can be read by host computer 32. When the entire packet is finished, the logic checks the FCS that is at the end with the FCS it has calculated from the packet data. If the FCS is correct, then the time in the temporary register is transferred to a register that host computer 32 can read and sets an interrupt to host computer 32. Host computer 32 services the interrupt and does a calculation based on the difference between the local time and the time master time. The logic of real-time synchronization circuit 36 that controls the local time base is adjusted to sync with the time master. Since the time base error is calculated using the time captured when the packet arrived, no latency errors exist. If path latency can be kept to within 0.5 millisecond, the total error will be within the desired 1 millisecond. Host computer 32 can average the latency and remove the fixed delay if desired.

Path Latency Calculation

HSE test packets for a maximum of 512 nodes contain about 400 bytes. At 100 Mbit/sec there are 10 ns per bit or 80 ns per byte. So, 400 bytes is 32 microseconds. If there is a one-packet queue in the switch, there would be 32 microseconds of delay per packet per switch. In a busy system there might be a full-length packet ahead of the output in the queue. A full-length packet is 1518 bytes for a delay of 0.122 milliseconds. If keeping the latency under 0.5 milliseconds is desired, then the number of switches between the time master and the listener should be kept to 4 or 5 on a heavily loaded system. Analysis of the type of packets in control system 20 should be done in order to make recommendations on the network topology. For this reason, the time master node should be at the top of the switch hierarchy.

Time Base

In real-time synchronization circuit 36, the time base is driven by the basic 33 MHz oscillator contained in the computing node. This clock is first divided by 33⅓ to obtain a 1-microsecond clock. The 1-microsecond clock drives logic that generates a one-clock-wide pulse nominally every 125 microseconds. Control of the 125-microsecond pulse allows regulation of the timing circuitry.

The 1-microsecond clock is preferably used to drive two timing chains. One of the chains is for the HSE time stamp. This chain is a monotonically increasing 64-bit register that is programmable by host computer 32 at startup time for the current date, year and time. This register is clocked by the 1-microsecond clock and enabled by a one-clock-wide pulse approximately every 125 microseconds. The 125-microsecond pulse is regulated by the control logic to obtain clock synchronization.

The second chain is advanced by the 1-microsecond clock and counts up to 1 second and is used in combination with other logic to regulate the 125-microsecond pulse as well as to interrupt host computer 32 every second.

The regulation method is based on host computer 32 programming the number of 10 microsecond increments to add or subtract every second to/from the 125-microsecond pulse that enables the HSE time counter. If the counter is 10 microseconds shorter or longer every second, then a plus or minus 10 parts per million change is possible. The control register is 12 bits with one bit for sign for a possibility of + or −40960 parts per million of frequency control. For example, if host computer 32 programs a 1 in the register, one of the 125-microsecond enabling pulses will occur at an interval of 124 microseconds every second. This will cause the HSE clock to speed up by 10 parts per million. If host computer 32 programs a 1 in the register and a 1 in the sign bit, there will be one enabling pulse interval that is 126 microseconds every second. This will cause the HSE clock to slow down by 10 parts per million MII Snooping in the Listener Referring to FIG. 2, PHY transceiver 38 includes a PHY receiver 40 and a PHY transmitter 42. The interface between PHY transceiver 38 and MAC controller is the Media Independent Interface (MII).

PHY receiver 40 receives packets of data from the other computing nodes via network 28 (FIG. 1) and supplies via a selected A or B channel a PHY clock signal and a packet data in nibbles (four bits per nibble) to real-time synchronizing circuit 36. PHY transmitter receives, via a B channel, an MAC clock signal from the MAC controller and data nibbles of a data packet to be transmitted. PHY transmitter 42 receives the HSE test packet via a selected A or B channel from real-time clock synchronizing circuit 36.

Real-time clock synchronizing circuit 36 includes a receive shift register 44 into which the clock signal shifts the nibbles one by one. Real-time clock synchronizing circuit 36 also includes a comparison logic and state machine controller 46, a time stamp capture register 48, a local time capture register 50, a local time counter 52, a transmit shift register 54, a comparison logic and state machine controller 56 and an output multiplexer 58.

Figure 2:
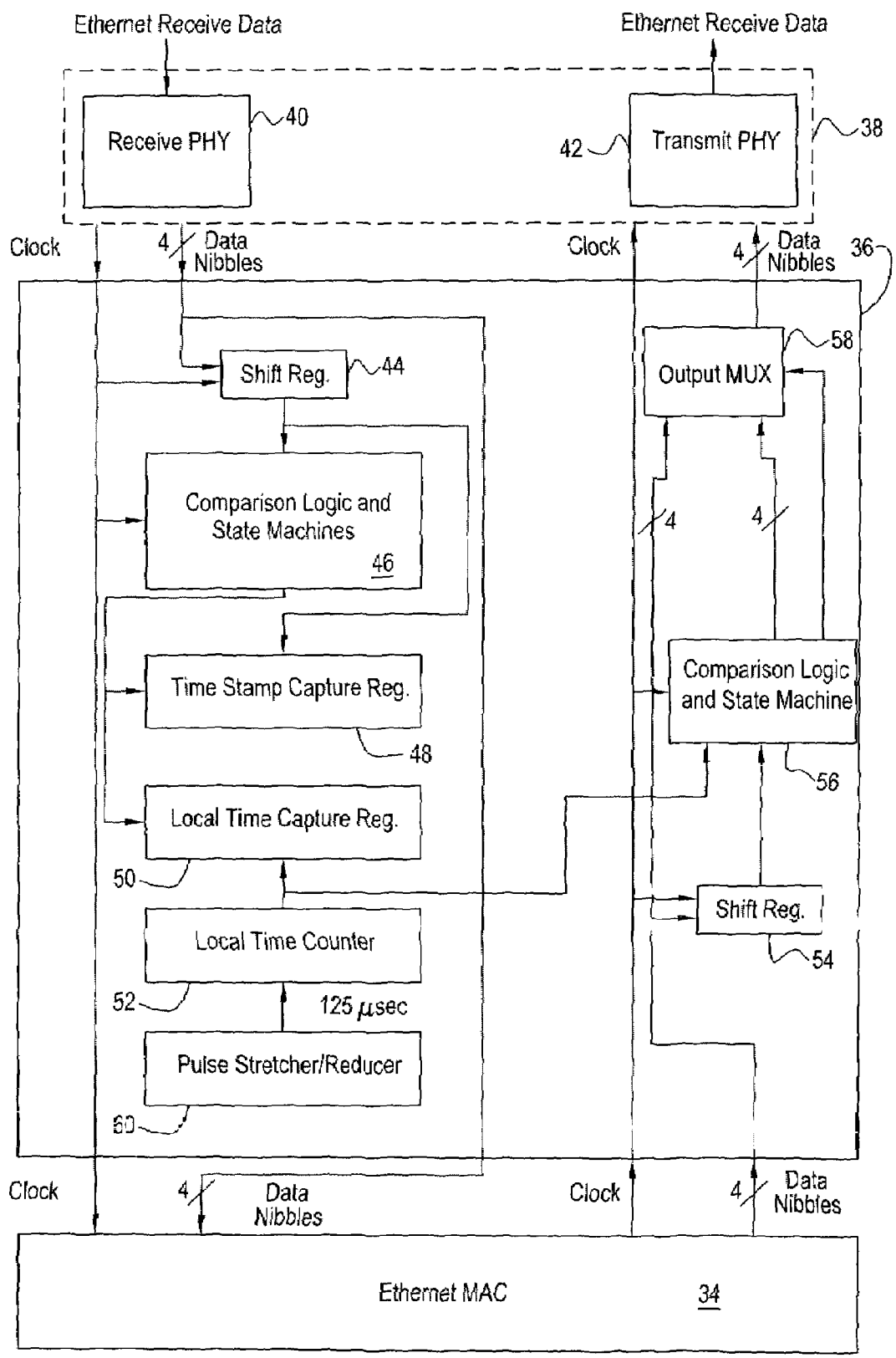
FIG. 2 is a block diagram of the real-time clock synchronizing circuit of the synchronization device of the control system of FIG. 1.
Figure 4:
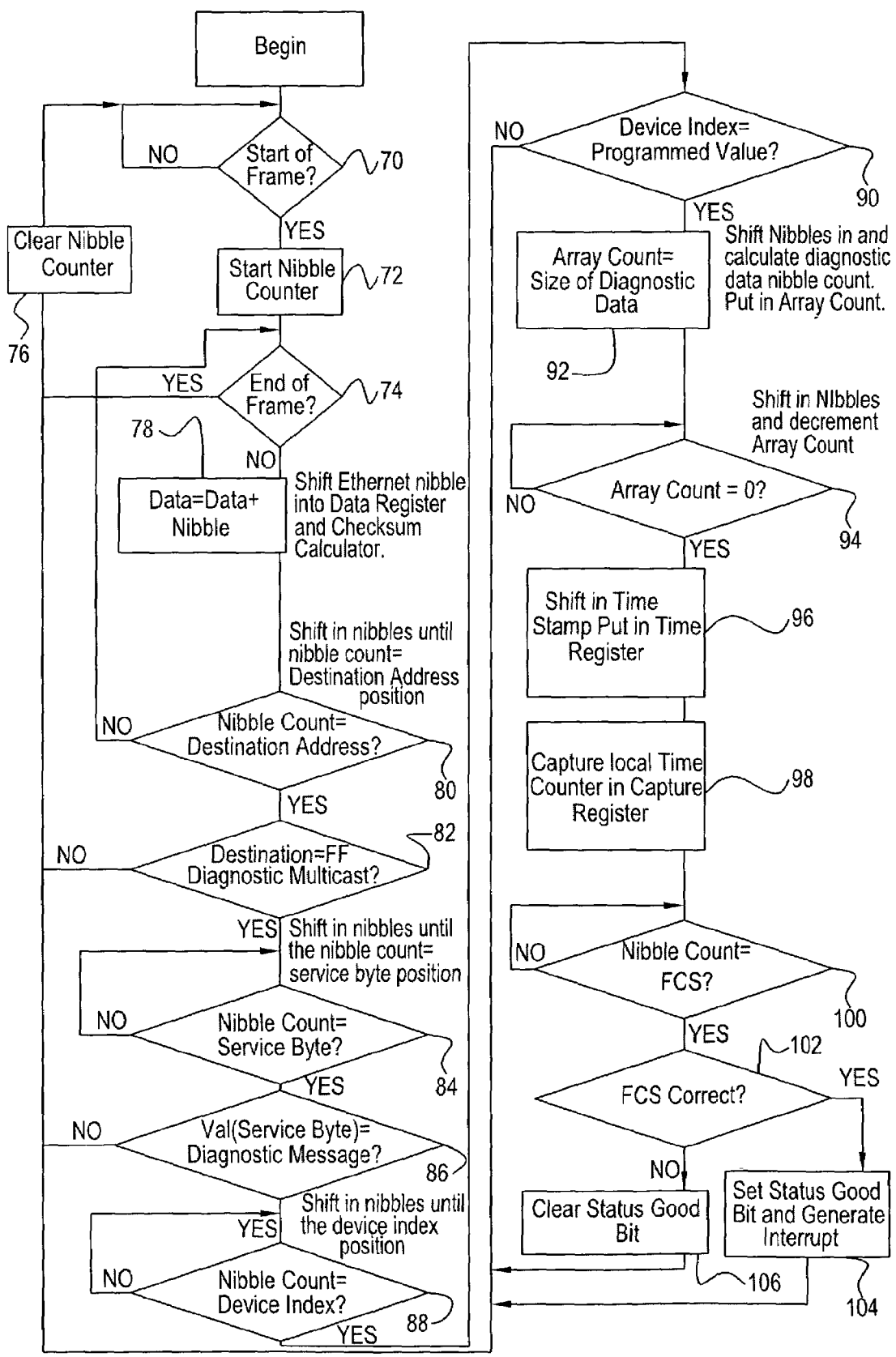
FIG. 4 is a logic flow diagram for the receive step according to the real-time clock synchronizing method of the present invention.

Referring to FIGS. 2 and 4, the operation of real-time clock synchronizing 36 will be described for the listening mode in which another of the computing modes acts as a time master, transmitting the HSE test packet periodically (e.g., at 0.5 second intervals). The PHY clock signal clocks the nibbles into receive shift register 44 as well as into a register (not shown) of MAC controller 34. The PHY receiver 40 gives an indication of when valid data is being received through a separate line RX_DV (not shown) to controller 46. Controller 46 responds at step 70 of FIG. 4 to start looking for the start of frame in the data. Once the start of frame is found, step 72 starts a nibble counter (not shown) of controller 46 to count nibbles. As each nibble is counted, step 78 determines if the current nibble is the end of frame. If yes, step 76 clears the nibble counter and control passes to step 70.

If step 74 determines that the current nibble is not the end of a frame, step 78 shifts the nibble into a data register and checksum calculator (not shown) of controller 46. Step 80 determines if the nibble count is equal to the destination address. If not, steps 74, 78 and 80 are repeated until the destination address or IP address is encountered. Then step 82 determines if the destination address is a diagnostic multicast data packet. If not, step 76 clears the nibble counter and control returns to step 70. If step 82 determines that the destination address is the multicast address, the destination address is saved and compared with the diagnostic multicast address configured by host computer 32. On this comparison, an HSE test message is considered detected. Step 84 counts nibbles until the nibble count is equal to the service byte count (position of the FF HSE Diagnostic Message type identifier).

Step 86 compares the message type with the value of FF HSE Diagnostic Message to determine if the message is a diagnostic message. If not, step 76 clears the nibble counter and control is returned to step 70. If step 86 determines that the message is a FF HSE diagnostic message, step 88 counts nibbles until the nibble count equals the device index (the FF HSE device ID). When this happens, step 90 determines if the device index and the programmed value (configured ID) are the same. Host computer 32 will have previously programmed the ID of the time master node in the configured ID. If not, step 76 clears the nibble counter and control returns to step 70. If so, in step 92 the logic will count nibbles until the number of nodes in the community field is encountered. When the number of nodes field is encountered, the logic will multiply the number of nodes by 8 and save this value in a temporary register. The logic will count nibbles until the node status fields begin. At this point, a down counter is started. When the down counter reaches 0, it indicates the end of the node status table. The next field is the time stamp.

Step 96 will then store the time stamp (from step 84) in time stamp capture register 48 that can be read by host computer 32. At the same time, step 98 captures the time value of local time counter 52 and stores it in local time capture register 50. Host computer 32 can access registers 48 and 50 and compare the two values so as to determine an error value and calculate a correction value to put in a 125-microsecond pulse stretcher/reducer 60 in FIG. 2. Step 100 counts nibbles until the FCS byte position is reached. Controller 46 has been calculating the checksum throughout the entire message since the Start of Frame (SFD). Step 102 compares the received FCS with the calculated FCS. If the FCS is correct, step 104 sets a status bit and generates an interrupt to inform the host computer 32 that a new time value has arrived. If the FCS does not compare, step 106 will clear the status bit and not generate an interrupt. Step 76 then clears the nibble counter and control returns to step 70.

Controller 46 will be programmed by host computer 32 to use cable A or cable B for the time snooping. The FTE test algorithm running in host computer 32 will discover if there is a bad path and host computer 32 can use this information to determine which cable should be monitored for the most reliable time data.

MII Snooping in the Clock Master

Figure 3:
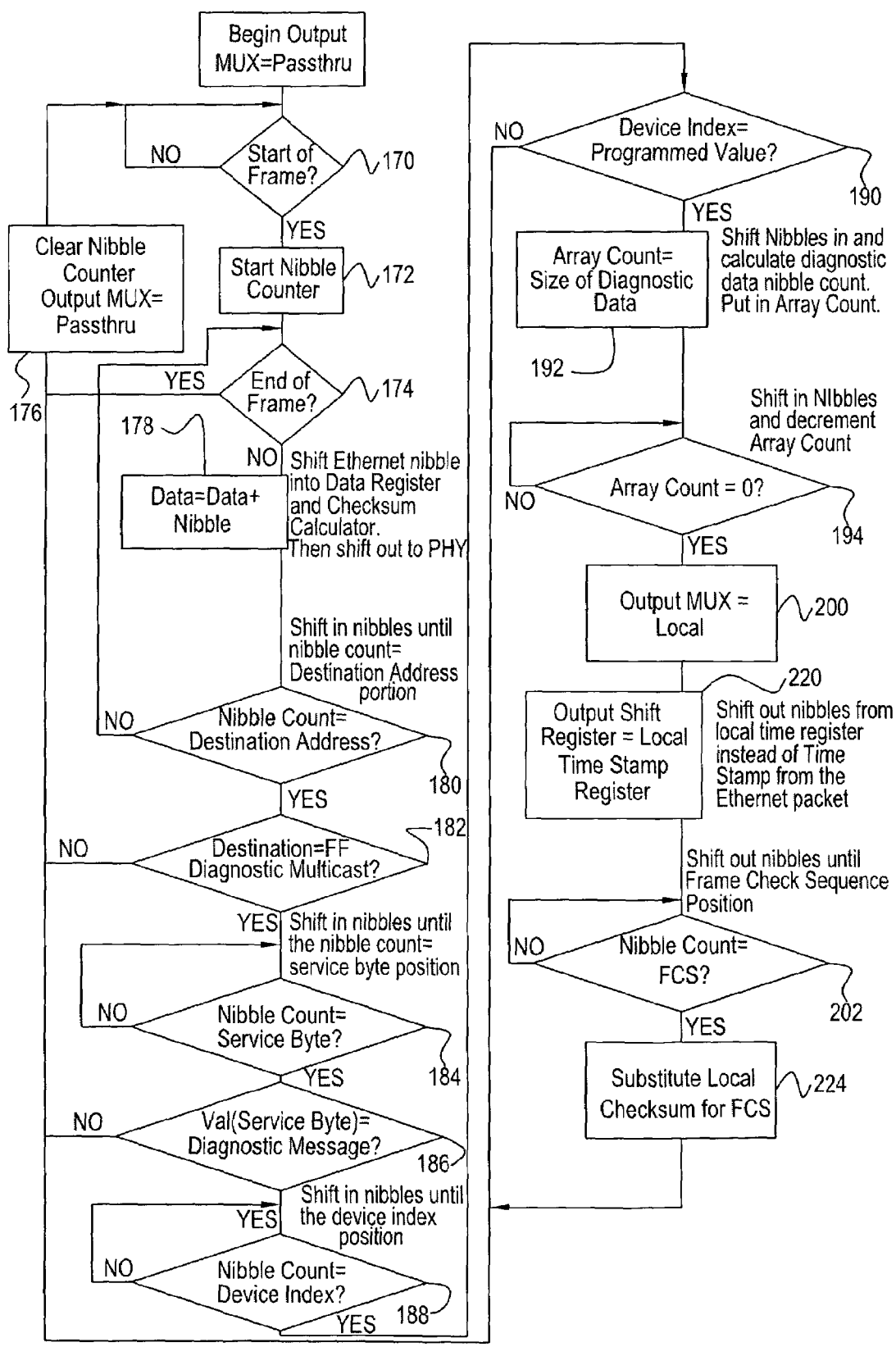
FIG. 3 is a logic flow diagram for the transmit step according to the real-time clock synchronizing method of the present invention.

Referring to FIGS. 2 and 3, the master timer mode of operation will now be described. Controller 56 can be programmed to listen to the transmit port from the MAC controller. The operation is similar to the listener mode with a few exceptions. Steps in FIG. 3 bear reference numerals in the 100 series with tens and single digits corresponding to reference numerals of steps of FIG. 4 that have the same functions. The transmit MII interface does not have an RX_DV signal to indicate when the data is good, but does have a TX_EN transmit enable signal that frames the valid data. The TX_EN transmit enable signal can be used in a similar way to enable controller 56 at step 170 to begin looking at the data for the SFD. The operation from step 170 to step 220 (when the time stamp is encountered is identical to the receive channel). Step 170 is also operable to operate multiplexer 58 to couple the nibbles of the HSE test packet to PHY transmitter 42. When the time stamp arrives, step 220 will substitute the current time value of the local HSE time register (not shown) into the transmit stream. The host computer 32 can put any value in this field in the HSE test packet, but preferably the local HSE time register value is used at the time the packet is built. Step 202 continues to count nibbles until the FCS is reached. Controller 56, like controller 46, continually calculates the FCS as the nibbles are counted. Step 224 substitutes the calculated FCS from the passed data and the new time stamp and operates multiplexer 58 to couple the calculated FCS and the new time stamp to PHY transmitter 42 in the proper locations of the HSE test packet. That way the host computer code that generates the test packet does not need to test if it is the time master. No interrupts are necessary when this function is complete.

Common Logic

Since the operation of a computing node 22, 24 or 26 will be either as a listener or as a master, controllers 46 and 56 of a node can be a single controller with logic to do most of the work so as to be multiplexed to do one function or the other. On the input to the logic there needs to be a 4-to-1 multiplexer to select the MII port from Receive A, Receive B, Transmit A or Transmit B. On the transmit MII interfaces to the PHY receiver 40 or PHY transmitter 42, there needs to be 2-to-1 multiplexer on each. The multiplexers select either the data straight from the MAC controller 34, or the modified packet from controller 56 with the new time stamp and the new FCS RMII Conversion In the computing node architecture there may be a need to convert from the MII interface used by the MAC controller 34 and a Reduced MII (RMII) interface that some PHY transceivers use. This conversion can also be handled by the real-time clock synchronizing circuit 36. This is actually preferable as the number of pins needed by RMII is much less than the MII interface.

While several embodiments in accordance with this invention have been shown and described, it is to be clearly understood that the same are susceptible to numerous changes apparent to one skilled in the art. Therefore, this application will not be limited to the details shown and described but it is intended to show all changes and modifications which come within the scope of the appended claims.

What is claimed is:

1. A method for synchronizing computing nodes in a control system, each computing node comprising a host computer and a transceiver, said method comprising:

monitoring a master time data packet for a time stamp contained therein, said data packet being provided by said host computer to said transceiver for a master timer mode and being provided by said transceiver to said host computer for a listening mode;

saving said monitored time stamp during said listening mode;

notifying said host computer of said saved time stamp during said listening mode; and substituting a current time stamp value from a local timer for said monitored time stamp and supplying said time data packet with said substituted time stamp to said transceiver during said master timer mode.

2. The method of claim 1, wherein each of said computing nodes further comprises a network controller disposed between said host computer and said transceiver.

3. The method of claim 2, wherein said computing nodes are connected in a fault-tolerant Ethernet network, and wherein said transceiver is a physical interface (PHY) transceiver and said network controller is a media access controller (MAC).

4. The method of claim 1, wherein said time data packet is also monitored for a frame check sequence (FCS) value; and further comprising:

during said master timer node, substituting a calculated FCS value for said monitored FCS value and supplying said substituted FCS value to said transceiver.

5. The method of claim 4, wherein during said listen mode, said host computer is notified or not notified of said monitored time stamp based on a comparison of said monitored FCS value with said calculated FCS value.

6. The method of claim 1, further comprising the step of saving a current time value when said monitoring step detects said monitored time stamp.

7. The method of claim 6, wherein each of said computing nodes further comprises a local timer, and wherein said method further comprises the step of adjusting said local timer during said listen mode based on said saved time stamp and said saved current time.

8. The method of claim 1, wherein said time data packet is also monitored for an identity of the sender of the time data packet and wherein said method further comprises the step of restarting said method if said identity is invalid.

9. The method of claim 1, wherein said time data packet is also monitored for a multicast address, and further comprising the step of restarting the method if each of said computing nodes is not a subscriber to said multicast address.

10. The method of claim 1, wherein said time stamp includes real time.

11. A real-time synchronizing circuit for a computing node adapted for connection in a network, said computing node comprising a host computer and a transceiver, said circuit comprising:

a local timer, and a logic device that is operable (1) in a master-time transmit mode to substitute a current time value of said local timer for a master time stamp contained in a packet of data provided by said host computer and to forward said packet of data with said substituted current time value to said transceiver, thereby compensating for delay due to said host computer, and (2) in a listen mode to save a master time stamp contained in a packet of data received from said transceiver and to save a current value of said local timer.

12. The circuit of claim 11, wherein said master time stamp is not saved during said listen mode if said packet of data includes an invalid identity of a sender thereof.

13. The circuit of claim 12, wherein said master time stamp is not saved during said listen mode if said packet of data includes a multicast address and said circuit is a non-subscriber to said multicast address.

14. The circuit of claim 11, wherein said computing node further comprises a network controller disposed between said host computer and said transceiver.

15. The circuit of claim 14, wherein said computing node is connected in a fault-tolerant Ethernet network, and wherein said transceiver is a physical interface (PHY) transceiver and said network controller is a media access controller (MAC).

16. The circuit of claim 11, wherein said time stamp includes real time.

17. A computing node comprising:

a host computer and a transceiver adapted for connection in a network;

a real-time synchronizing circuit comprising:

a local timer, and a logic device that is operable (1) in a master-time transmit mode to substitute a current time value of said local timer for a real-time master time stamp contained in a packet of data provided by said host computer and to forward said packet of data with said substituted current time value to said transceiver, thereby compensating for delay due to said host computer, and (2) in a listen mode to save a master time stamp contained in a packet of data received from said transceiver and to save a current value of said local timer.

18. The computing node of claim 17, wherein said host computer performs an update operation by adjusting said local timer based on said saved master time stamp and said saved current time value.

19. The computing node of claim 17, wherein said master time stamp and said local current time value are saved in first and second registers, respectively.

20. The computing node of claim 17, wherein said real-time synchronizing circuit further comprises a shift register for receiving said packet of data from said host computer and a multiplexer for switching an input of said transceiver to receive said packet of data from said shift register, except for said master time stamp, and to receive said current time value of said local timer in lieu thereof.

21. The computing node of claim 17, further comprising a network controller disposed between said host computer and said transceiver.

22. The computing node of claim 21, wherein said computing node is connected in a fault-tolerant Ethernet network, and wherein said transceiver is a PHY transceiver and said network controller is a MAC controller.

23. The computing node of claim 17, wherein said time stamp includes real time.

* * * * *